July 1, 1958    R. G. HALL    2,841,481
PYROTECHNIC MASSES
Filed Feb. 23, 1955
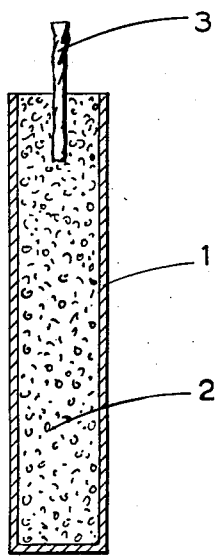
INVENTOR
BY Ronald Gibson Hall
ATTORNEY United States Patent Office
2,841,481
Patented July 1, 1958

2,841,481

PYROTECHNIC MASSES

Ronald Gibson Hall, Hemel Hempstead, England, assignor to Brock's Crystal Palace Fireworks Limited, Hemel Hempstead, England, a British company Application February 23, 1955, Serial No. 490,063

Claims priority, application Great Britain March 11, 1954

8 Claims. (Cl. 52—23)

This invention relates to pyrotechnic compositions.

It is an object of this invention to provide pyrotechnic compositions which are stable and which facilitate the manufacture of pyrotechnics, for example fireworks and load-carrying rockets and which have the advantages hereinafter set forth.

A pyrotechnic composition according to the present invention comprises an intimate mixture of phenol-formaldehyde resin, a urea-formaldehyde resin or a melamine-formaldehyde resin, an oxidising agent which is an ammonium, alkali metal, alkaline earth metal or urea nitrate or an alkali metal or alkaline earth metal chlorate or an ammonium, alkali metal or alkaline earth metal perchlorate or chromate and if desired a material which produces colour on ignition of the composition.

The composition may also if desired contain an organic nitro compound which is particularly useful in the case of load-carrying rockets.

It will be understood that more than one condensing agent may be used but care should be taken not to use chlorates in the presence of ammonium salts since mixtures containing these are unstable even at room temperatures and are unduly sensitive to shock and friction.

The present invention also includes a pyrotechnic, for example a firework comprising a casing having therein a pyrotechnic composition according to the present invention.

The present invention further includes a process for the manufacture of pyrotechnic compositions which comprises mixing together a liquid phenol-formaldehyde, urea-formaldehyde or melamine-formaldehyde condensation product, a finely divided oxidising agent which is an ammonium, alkali metal, alkaline earth metal or urea nitrate or an alkali metal or alkaline earth metal chlorate or an ammonium, alkali metal or alkaline earth metal perchlorate or chromate and if desired a material which produces colour on ignition of the composition and polymerising the condensation product in the presence of a polymerisation catalyst.

The polymerisation catalyst should be an acid or acid yielding substance and is preferably urea nitrate or ammonium perchlorate. It will be understood that when either of these substances is used as the catalyst it may also serve as a whole or a part of the oxidising agent. Examples of other polymerisation catalysts which may be used are phosphoric acid and hydrochloric acid. Urea nitrate yields acid by hydrolysis and ammonium perchlorate reacts with part of the formaldehyde with the formation of perchloric acid.

The condensation products are preferably used in the form of syrups and are well known articles of commerce, containing for example 65 to 75% by weight of total solids. The organic solid content serves both as fuel and also as a binding medium for the oxidising agents and colour producing ingredients in the pyrotechnic compositions.

The proportions of the ingredients may vary fairly widely and the following table gives the parts by weight of the oxidising agents which are preferably used per part by weight (calculated on the dry solid content) of the urea-formaldehyde or melamine-formaldehyde condensate to give satisfactory results:

| | Parts by weight |
|---|---|
| Ammonium perchlorate | 1 to 1.6 |
| Ammonium nitrate | 1 to 1.5 |
| Potassium perchlorate | 1 to 2.5 |
| Potassium chlorate | 0.5 to 2 |
| Potassium nitrate | 1 to 2 |
| Strontium nitrate | 1 to 2.5 |
| Strontium perchlorate | 1 to 3.5 |
| Barium nitrate | 1 to 3 |
| Barium perchlorate | 1 to 3.5 |
| Urea nitrate | 1 to 2 |
| Sodium nitrate | 1 to 2 |
| Sodium perchlorate | 1 to 2 |
| Sodium chlorate | 0.5 to 2 |
| Copper nitrate | 1 to 3 |
| Barium chlorate | 1 to 3 |
| Ammonium dichromate | Up to 3 |

In the case of the phenol-formaldehyde condensates, preferably one to three parts by weight of the oxidising agent is used per part of phenol-formaldehyde condensate.

A small proportion of copper nitrate or lampblack may be added to the composition to promote even burning.

In carrying out the process of the invention the solid ingredients which should be ground to pass a 120 mesh B. S. sieve or finer are added to the liquid condensate and stirred to effect mixture. Preferably the mixture should have the consistency of a thick cream. The catalyst is always added last when urea-formaldehyde resins are used to prevent premature polymerisation and setting of the mixture.

Depending upon the proportion of catalyst, preferably ammonium perchlorate or urea nitrate present, and upon the temperature the time taken to polymerise to a hard inflexible mass may be varied from two minutes to five hours. The time may be extended further by the addition of 1% to 2% of hexa-methylenetetramine calculated on the weight of solid content of the condensate used.

Burning times may be varied by varying the type and quantity of oxidising agent used, potassium perchlorate and barium chlorate producing the most rapid rates of burning, followed by ammonium perchlorate and the nitrates in ascending order of burning time, when amounts are taken between the limits specified. The rate of burning of the finished products may in the case of urea-formaldehyde resins be varied by heating for three minutes at 80°–100° C. when the mass is rendered more porous, permitting easier flame propagation on ignition.

If artificial heating is not used, then two weeks standing at normal room temperature (15° C.) are necessary before even burning of the finished product results.

Any of the materials usually employed to produce colour on ignition of this composition with the exception of sulphides and carbonates may be used. If magnesium or iron is used the particles of the metal should be coated with a varnish, e. g. a spirit base shellac varnish, to prevent reaction with any acid present in or produced by the catalyst. Examples of coloured smoke-producing materials are oil green, oil orange and Rhodamine B. For producing coloured flames barium oxalate, strontium oxalate, strontium nitrate and barium chlorate may be used. For producing sparks aluminium may be used.

Other smoke-producing materials may be used such as hexachlorethane or naphthalene and if desired volatile insecticidal compounds may also be incorporated in the compositions.

The compositions of the present invention may be filled into casings by extrusion and consolidation of the composition is not necessary.

The accompanying drawing shows a sectional view of a firework according to the invention.

Referring to the drawing, the firework consists of a casing 1, a filling 2 of a pyrotechnic composition according to the present invention and a fuze 3.

The following are examples of compositions according to the present invention.

Example 1

18 gms. of urea-formaldehyde syrup (72% total solids)
10 gms. of sodium chlorate
20 gms. of starch (farina)
0.5 gm. of urea nitrate
10 gms. of Rhodamine B This composition is suitable for the production of a coloured smoke. Instead of the Rhodamine B another colour-forming ingredient may be used such as oil orange or oil green.

Example 2

18 gms. of urea-formaldehyde syrup (72% total solids)
30 gms. of potassium perchlorate
5 gms. of ammonium perchlorate
2 gms. of barium oxalate
8 gms. of wood charcoal This composition is suitable for use in the manufacture of coloured stars.

Instead of the barium oxalate another colour-forming ingredient may be used such as strontium nitrate, strontium oxalate or barium chlorate.

Example 3

18 gms. of urea-formaldehyde syrup (72% total solids)
25 gms. of ammonium perchlorate
10 gms. of potassium nitrate
2 gms. of strontium nitrate

Example 4

18 gms. of urea-formaldehyde syrup (72% total solids)
36 gms. of ammonium perchlorate
6 gms. of finely divided aluminium
2 gms. of strontium oxalate The compositions of Examples 3 and 4 are suitable for producing cones and fountains and coloured lights.

Example 5

10 gms. of urea-formaldehyde syrup (72% total solids)
10 gms. of ammonium nitrate
10 gms. of ammonium dichromate
5 gms. of oil green This composition is suitable for producing a coloured smoke.

The compositions of the above examples set hard and are not liable to be shaken loose from the finished articles by normal or even careless handling. Cavitation of the filling and consequent danger of explosion of the finished firework upon ignition is obviated. The need for a strong closure of the fireworks case is less than in the usual types of pyrotechnic compositions. The compositions, except those used for producing coloured smoke, are very difficult to ignite in the unpolymerised state and compared with ordinary pyrotechnic compositions, are very insensitive in the mixing and pre-polymerising steps. This contributes to the greater safety of the operatives.

The following Examples 6 to 13 illustrate the use of phenol-formaldehyde condensates. In each of the examples the phenol-formaldehyde syrup was intimately mixed with the oxidising agent and the organic nitro compound (if used) and the acid catalyst incorporated in the mixture when a creamy composition capable of extrusion and/or casting was obtained. Two or three minutes at 80° C. or longer times at lower temperatures suffice to harden the mix to a solid dense mass.

Example 6

1 gm. of phenol-formaldehyde syrup (Catalin 674/2B made by Catalin & Co., Ltd.)
2 gms. of potassium nitrate
0.1 gm. of phosphoric acid

Example 7

1 gm. of phenol-formaldehyde syrup (Catalin 318T made by Catalin & Co., Ltd.)
2 gms. of potassium perchlorate
0.1 gm. of hydrochloric acid The compositions of Examples 6 and 7 are suitable for filling rockets.

Example 8

1 gm. of phenol-formaldehyde syrup (Catalin 674/2B)
2 gms. of potassium nitrate
1.75 gms. of potassium perchlorate
0.1 gms. of hydrochloric acid This composition is suitable for the production of tourbillions.

Example 9

1 gm. of phenol-formaldehyde syrup (Catalin 318T)
2 gms. of potassium nitrate
0.1 gm. of phosphoric acid The potassium nitrate may be replaced by 1.75 to 2 gms. of potassium perchlorate.

This composition is suitable for the production of hummers.

Example 10

1 gm. of phenol-formaldehyde syrup (Catalin 674/2B)
2.5 gms. of potassium nitrate
0.1 gm. of hydrochloric acid The potassium nitrate can be replaced by 1.75 to 2 gms. of potassium perchlorate. This composition is suitable for the production of whizzers.

Stars, cones and fountains may be equally well produced by the incorporation of metal flakes and powders and the usual colour producing salts used by the pyrotechnist.

Example 11

20 gms. of phenol-formaldehyde syrup (Catalin 674/2B)
35 gms. of potassium nitrate
15 gms. of ammonium picrate
2 gms. of hydrochloric acid

Example 12

20 gms. of phenol-formaldehyde syrup (Catalin 674/2B)
45 gms. of potassium nitrate
15 gms. of picric acid
2 gms. of hydrochloric acid

Example 13

20 gms. of phenol-formaldehyde syrup (Catalin 674/2B)
45 gms. of potassium perchlorate
15 gms. of nitroguanidine
2 gms. of hydrochloric acid The compositions of Examples 11 to 13 are suitable for the production of load-carrying rockets.

The compositions of Examples 6 to 13 make simple machine filling possible and closing of the case is not necessary in hummers, tourbillions and whizzers from the functional point of view.

In the case of rockets increment filling is not required and there is greater control over the burning characteristics of rocket mixtures since these can be pre-cast to any ballistic shape required. There is also a more uniform burning of the compositions.

The following Example 14 illustrates the use of a melamine-formaldehyde condensate.

*Example 14*

160 gms. of melamine-formaldehyde syrup
160 gms. of ammonium perchlorate
40 gms. of strontium nitrate
40 gms. of aluminium powder The melamine-formaldehyde syrup was intimately mixed with the strontium nitrate and aluminium powder and the ammonium perchlorate was then added when a creamy composition capable of extrusion and/or casting was obtained. The mix quickly hardened to a solid mass.

The composition is suitable for the production of red stars. The term "finely divided" as used herein means that the material will pass through a 120 mesh British standard sieve.

What I claim is:

1. A pyrotechnic mass which consists essentially of an intimate mixture of a heat-hardened synthetic resin selected from the group consisting of phenol-formaldehyde resins, urea-formaldehyde resins and melamine-formaldehyde resins and an oxidizing agent selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent.

2. A pyrotechnic mass which consists essentially of an intimate mixture of a heat-hardened synthetic resin selected from the group consisting of phenol-formaldehyde resins, urea-formaldehyde resins and melamine-formaldehyde resins, an oxidising agent selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent, and a material which produces colour on ignition of the composition.

3. A pyrotechnic mass which consists essentially of an intimate mixture of a heat-hardened synthetic resin selected from the group consisting of phenol-formaldehyde resins, urea-formaldehyde resins and melamine-formaldehyde resins, an oxidizing agent selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent, and an organic insensitive nitro compound selected from the group consisting of ammonium picrate, picric acid and nitroguanidine in the proportion of up to 1.15 parts of nitro compound per part of dry resin.

4. A pyrotechnic comprising a casing having therein a pyrotechnic mass which consists essentially of an intimate mixture of a heat-hardened synthetic resin selected from the group consisting of phenol-formaldehyde resins, urea-formaldehyde resins and melamine-formaldehyde resins and an oxidising agent selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent.

5. A process for the manufacture of a pyrotechnic mass which comprises mixing together a liquid heat-hardenable synthetic resin condensation product selected from the group consisting of liquid phenol-formaldehyde condensation products, liquid urea-formaldehyde condensation products and liquid melamine-formaldehyde condensation products and an oxidising agent in a state of subdivision which passes through a 120 mesh B. S. screen selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent, and polymerising the condensation product in the presence of a polymerisation catalyst.

6. A process for the manufacture of a pyrotechnic mass which comprises mixing together a liquid heat-hardenable synthetic resin condensation product selected from the group consisting of liquid phenol-formaldehyde condensation products, liquid urea-formaldehyde condensation products and liquid melamine-formaldehyde condensation products, an oxidising agent in a state of subdivision which passes through a 120 mesh B. S. screen selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent, and a material which produces colour on ignition of the composition, and polymerising the condensation product in the presence of a polymerisation catalyst.

7. A process for the manufacture of a pyrotechnic mass which comprises mixing together a liquid heat-hardenable synthetic resin condensation product selected from the group consisting of liquid phenol-formaldehyde condensation products, liquid urea-formaldehyde condensation products and liquid melamine-formaldehyde condensation products, an oxidising agent in a state of subdivision which passes through a 120 mesh B. S. screen selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent and an organic insensitive nitro compound selected from the group consisting of ammonium picrate, picric acid and nitroguanidine in the proportion of up to 1.15 parts of nitro compound per part of dry resin, and polymerising the condensation product in the presence of a polymerisation catalyst.

8. A process for the manufacture of a pyrotechnic mass which comprises mixing together a liquid heat-hardenable synthetic resin condensation product selected from the group consisting of liquid phenol-formaldehyde condensation products, liquid urea-formaldehyde condensation products and liquid melamine-formaldehyde condensation products and an oxidising agent in a state of subdivision which passes through a 120 mesh B. S. screen selected from the group consisting of ammonium nitrate, alkali metal nitrates, alkaline earth metal nitrates, urea nitrate, alkali metal chlorates, alkaline earth metal chlorates, ammonium perchlorate, alkali metal perchlorates, alkaline earth metal perchlorates, ammonium chromates, alkali metal chromates and alkaline earth metal chromates in the proportion of 1 part of the resin, dry weight, to 0.5–3.5 parts of the oxidizing agent, and polymerising the condensation product in the presence of a polymerisation catalyst selected from the group consisting of hydrochloric acid and phosphoric acid.

References Cited in the file of this patent

UNITED STATES PATENTS

| | | |
|---|---|---|
| 2,108,019 | Neukirch | Feb. 8, 1938 |
| 2,270,442 | Jares | Jan. 20, 1942 |
| 2,630,379 | Lytle | Mar. 3, 1953 |

FOREIGN PATENTS

| | | |
|---|---|---|
| 248,089 | Great Britain | Mar. 1, 1926 |